(12) United States Patent
Roller et al.

(10) Patent No.: US 6,623,150 B2
(45) Date of Patent: Sep. 23, 2003

(54) LIGHT-EMITTING DIODE COMBINATION MARKER/CLEARANCE LAMP FOR TRUCKS AND TRAILERS

(75) Inventors: Philip C. Roller, Ashville, NY (US); Chris A. Suckow, Kennedy, NY (US); Ronald Madison, Cherry Creek, NY (US); Timothy DiPenti, Russell, PA (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 09/938,648

(22) Filed: Aug. 23, 2001

(65) Prior Publication Data

US 2002/0044454 A1 Apr. 18, 2002

Related U.S. Application Data

(60) Provisional application No. 60/227,228, filed on Aug. 23, 2000.

(51) Int. Cl.[7] .................................................. F21V 5/00
(52) U.S. Cl. .................. 362/520; 362/522; 362/800; 362/545; 362/332; 362/240
(58) Field of Search ................. 362/800, 522, 362/520, 339, 332, 543, 544, 545, 237, 240

(56) References Cited

U.S. PATENT DOCUMENTS

| | | |
|---|---|---|
| 1,530,621 A | 3/1925 | Ritter |
| 2,254,961 A | 9/1941 | Harris .................... 240/106.1 |
| 2,254,962 A | 9/1941 | Harris et al. ............. 240/106.1 |
| 3,187,177 A | 6/1965 | Meyer ......................... 240/106 |
| 3,633,022 A | 1/1972 | Sassmashausen ........... 240/8.3 |
| 3,969,621 A | 7/1976 | Ferrell .................... 240/41.35 |
| 4,047,019 A | 9/1977 | Nagel ......................... 240/8.2 |
| 4,080,529 A | 3/1978 | Nagel ......................... 362/235 |
| 4,654,629 A | 3/1987 | Bezos et al. .................. 340/87 |
| 4,870,551 A * | 9/1989 | Nagel ......................... 362/522 |
| 4,914,544 A | 4/1990 | Dahlberg .................... 3/153.1 |
| 5,013,144 A | 5/1991 | Silverglate et al. ......... 350/435 |
| 5,150,958 A | 9/1992 | Miyazawa et al. ........... 362/66 |
| 5,240,344 A | 8/1993 | Green .......................... 404/14 |
| 5,325,271 A | 6/1994 | Hutchisson .................. 362/32 |
| 5,388,035 A | 2/1995 | Bodem, Jr. .................. 362/61 |
| 5,438,487 A | 8/1995 | Schmid et al. ................ 362/61 |
| 5,567,036 A | 10/1996 | Theobald et al. ............. 362/80 |
| 5,582,481 A | 12/1996 | Natsume ..................... 362/336 |
| 5,588,743 A | 12/1996 | Mayo et al. ................. 362/299 |
| 5,926,320 A | 7/1999 | Parkyn, Jr. et al. ......... 359/641 |
| 5,930,055 A | 7/1999 | Eisenberg ................... 359/728 |
| 6,095,663 A | 8/2000 | Pond et al. ................. 362/247 |
| 6,204,975 B1 | 3/2001 | Watters et al. .............. 359/633 |

* cited by examiner

*Primary Examiner*—Laura K. Tso
(74) *Attorney, Agent, or Firm*—The Bilicki Law Firm, PC

(57) ABSTRACT

The present invention is a vehicular combination marker/clearance lamp for trucks and trailers using a reduced number of light-emitting diodes and an optics design using total internal reflection to produce the light intensity and angular distribution required by the Department of Transportation. The present invention accomplishes this goal by utilizing a one-piece optical system. The system possesses a collimating lens, ribbed structures, and a modified conical shape, which will concentrate and distribute the light produced by the light-emitting diodes.

20 Claims, 4 Drawing Sheets

LIGHT-EMITTING DIODE COMBINATION MARKER/CLEARANCE LAMP FOR TRUCKS AND TRAILERS

This application claims the benefit of provisional application 60/227,228 filed Aug. 23, 2000.

FIELD OF THE INVENTION

The present invention is related to a combination marker/clearance lamp for vehicles, more particularly, a combination marker/clearance lamp for trucks or tractor-trailers.

BACKGROUND ART

Marker and clearance lamps are an important factor in the safe operation of trucks and trailers. These lamps make the vehicle more visible and detectable by other motorists, which effectively reduces the chances of collision.

A combination clearance and marker lamp should be able to indicate the overall width, height, and length of the vehicle. To accomplish this, the lamp must emit light over a wide range of angles.

In the past, combination marker/clearance lamps were made by high intensity incandescent bulbs. Combination marker/clearance lamps have also been made with light emitting diodes. Light emitting diodes have a relatively long service life. However, most light emitting diode designs require a large number of light emitting diodes and complicated optics or mirrors to provide the requisite intensity and spread of light. A large number of light emitting diodes creates problems with heat dissipation, thereby resulting in a more complicated lamp. For example, to achieve the desired distribution of light in these lamps, a reflective surface or mirror is required. In addition, some lamps have utilized segmented circuit boards with mounted light emitting diodes, or aimed light emitting diodes, to provide for different angles of light distribution. Reflective surfaces or mirrors add additional cost and at least one extra part to the lamp design. Segmented boards, on the other hand, usually require special mounting considerations and generally can not be potted for protection. The additional requirements of a segmented board construction make the construction of the lamp more complicated and potentially more fragile.

U.S. Pat. No. 5,388,035 shows a circular lamp using only three light emitting diodes. Each of the light emitting diodes is aimed in a specific angle such that the conical light output beam is centered on an axis that is normal to the plane of the lens wall. The rear surface of the lens front wall contains three sets of light spreading prism ribs, which are optically aligned with each light emitting diode. This arrangement provides for an output beam whose width is about 30 degrees in the vertical plane and 90 degrees in the horizontal plane. There are some disadvantages to this design, including but not limited to the requirement that light emitting diodes must be aimed at the correct angle and aligned perfectly with the corresponding set of optics during construction of the lamp. The resultant lamp provides an output beam whose width is only about 30 degrees in the vertical plane and 90 degrees in the horizontal plane.

The subject invention overcomes these issues by using less complicated optics and, in one embodiment, a smaller number of light emitting diodes, which do not require complicated alignments with optics or reflective surfaces. In addition, the subject invention distributes light over a wide range, in particular from 0 degrees to 90 degrees. This increase in light distribution provides for a more visible and detectable lamp by other motorists.

SUMMARY OF THE INVENTION

The present invention solves the above mentioned limitations of the prior art in a cost-effective manner by using a more simple optics design and, in one embodiment, a reduced number of light emitting diodes which does not require a mirror to produce the light intensity and angular distribution desired for combination marker/clearance lamps.

The present invention eliminates the need for mirrors by making use of a process called total internal reflection (TIR). The embodiments of the subject invention utilize an optical system that comprises, among other things, one or more collimating lenses capable of TIR above a light source. The TIR optical system provides that each collimating lens is disposed under a conical shape lens optic. The optical system further comprises rib optics. The optical system concentrates and disseminates the light produced by the light source over angles ranging from 0 degrees to 90 degrees horizontally to each side of the lamp.

In the embodiments of the invention, the light source is at least one light emitting diode. The embodiments of the invention provide for a reduced number of light emitting diodes, i.e. the maximum number of light emitting diodes required would be approximately four, but the subject invention could potentially work with as little as one light emitting diode.

In the embodiment disclosed herein, one light emitting diode is positioned under each of the collimating lenses capable of TIR. The collimating lens is a convex lens that intercepts the cone of light produced by the light emitting diode and converts the light to a beam of parallel lights. The resultant parallel beams illuminate the conical depression at the center of the TIR optics system. Because the parallel beams of light hit the conical surface at an angle greater than the critical angle, the light is reflected from the lens surface rather than transmitted through the lens surface. As a result, the light is distributed in a substantially horizontal, radial pattern. Viewed from the front of the lamp, the embodiments disclosed herein include an elliptical shaped protrusion surrounding the conical depression. This elliptical protrusion acts as a lens, concentrating the light, which is being distributed radially from the conical depression, into a more directional beam in order to assure adequate intensity to the left and right of the lamp in a range of approximately 60 degrees to 90 degrees.

These above mentioned and other objects of the invention will become more apparent from the following description of the best mode for carrying out the invention.

OBJECTS OF THE INVENTION

Accordingly, it is an object of the invention to utilize a reduced number of optical elements to attain the desired directional light emission.

Additionally, it is an object of the present invention to provide a combination marker/clearance lamp that utilizes a reduced number of light emitting diodes.

It is also an object of the present invention to provide a combination marker/clearance lamp that utilizes total internal reflection (TIR) to distribute light over a wide range of angles.

It is a further object of the present invention to provide a combination marker/clearance lamp that utilizes an optics design that eliminates the use of reflective surfaces and segmented circuit boards to emit and distribute light.

In addition, it is an object of this invention to provide a unique optical system, using ribbed structures, a collimating lens and a conical depression.

BRIEF DESCRIPTION OF THE DRAWINGS

Other aspects, objects, and advantages of the present invention appear more clearly on reading the following best mode for carrying out the invention, given by way of example and made with reference to the accompanying drawings, in which.

BEST MODE FOR CARRYING OUT THE INVENTION

Figure 1:
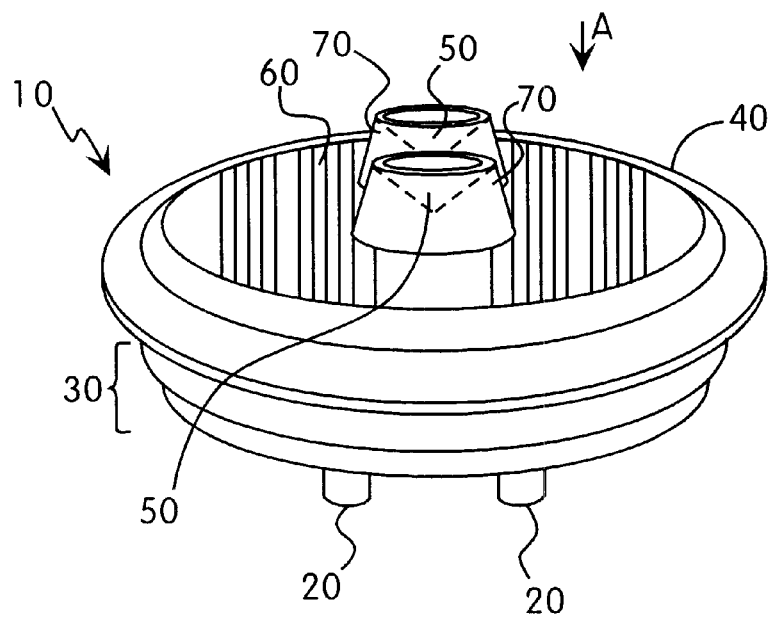
FIG. 1 is a three-dimensional perspective view of a marker/clearance lamp, one embodiment of the invention.

For the purpose of promoting an understanding of the present invention, reference will be made to an amber-colored lamp as illustrated in the drawings. It will nevertheless be understood that no limitation of the scope of the invention is thereby intended, such alterations as using a red lamp or advances in light emitting diode technology could provide additional alterations which would fall within the spirit and scope of the invention described herein. Some of the possible alterations will be mentioned in the following description.

FIG. 1 shows a three-dimensional front view image of lamp 10, one embodiment of the invention. In this embodiment, lamp 10 is a combined marker/clearance lamp for vehicles. Lamp 10 consists of housing 30, lens 40, one or more light emitting diodes 42 (not shown) as a light source, and one or more terminals 20. As illustrated in FIG. 1, lens 40 incorporates elliptical protrusions 70 with conical depressions 50 and ribbed structures 60. The one or more light emitting diodes 42 (not shown) are located under the optical elements described supra.

Both housing 30 and lens 40 of lamp 10 are constructed of transparent plastic that, in one embodiment, may be colored amber or red. Lens 40 is one piece and the external surface of lens 40 is not a smooth surface since it has raised regions such as elliptical protrusions 70, described in more detail hereinbelow.

Figure 2:
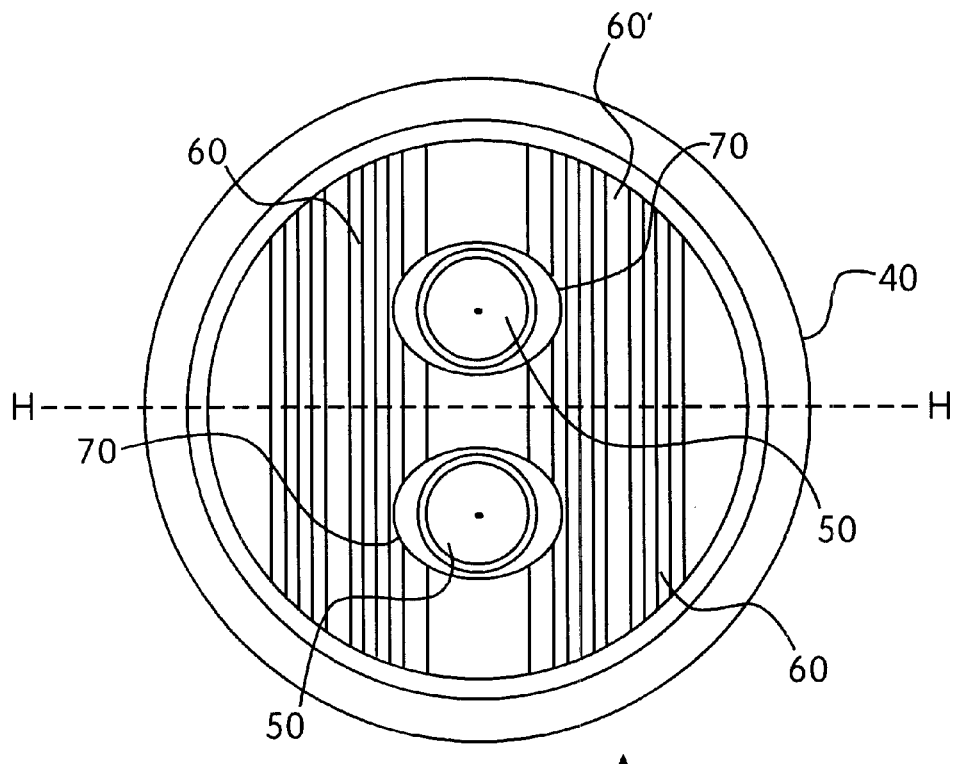
FIG. 2 is a top view of the marker/clearance lamp in FIG. 1.

FIG. 2 shows a top plan view of the embodiment shown in FIG. 1 (in the direction of arrow A as shown in FIG. 1). Conical depressions 50 at the center of each elliptical protrusions 70 are shown. The surface of each conical depression 50 reflects the light emitted from the one or more light emitting diodes 42 laterally to elliptical protrusion 70. Each elliptical protrusion 70 acts as a concentrating lens directing the reflected light. In addition, a plurality of ribbed structures 60 forming convex semicylindrical contours direct the light emitted from the one or more light emitting diodes 420 degrees to 60 degrees toward each side.

Lens 40 can be colored amber, red, or any other desirable color. In a preferred embodiment, lens 40 is a one-piece transparent plastic molding. One modification that could be made to the embodiments in FIGS. 1 & 2 is the presence of only one conical structure 50 and one elliptical protrusion 70. An embodiment that uses only one conical depression 50 and one elliptical protrusion 70 is better suited, with present technology, for use as a red-colored lamp; while an embodiment that uses two conical depressions 50 and elliptical protrusions 70 is better suited for use as a amber-colored lamp. One of ordinary skill in the art will readily appreciate that, as light emitting diodes of greater intensity are developed, the number of light emitting diodes can be reduced to as few as one, provided that conical depression 50 is modified to allow light to progress to the front of the lamp.

Figure 3:
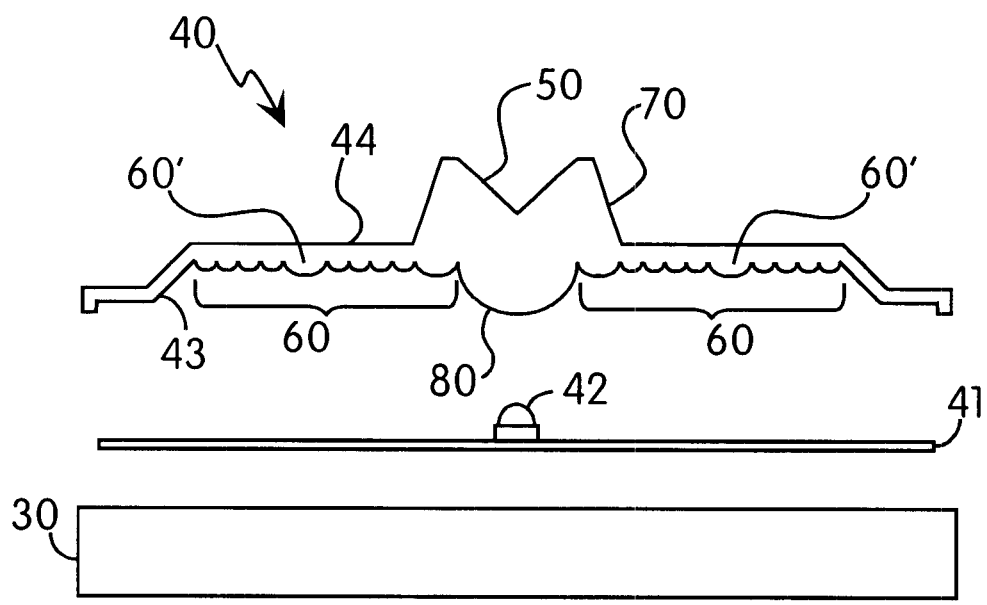
FIG. 3 is a cross section of the marker/clearance lamp in FIG. 1

FIG. 3 illustrates an exploded cross section of lamp 10 through one of conical structures 50 (in the direction of arrow B as shown in FIG. 2). FIG. 3 shows lens 40 at the top, circuit board 41 in the middle, and housing 30 at the bottom. In a preferred embodiment, light emitting diodes 42 will be secured to circuit board 41 as a light source. In the embodiment shown here, four light emitting diodes are used for an amber-colored lamp. More specifically, one light emitting diode 42 is disposed under each convex lens 80. Additionally, although not shown in FIG. 3, one light emitting diode 42 is disposed under each individual convex rib 60' along longitudinal axis H (as shown in FIG. 2). In another embodiment (not shown) three light emitting diodes will be used for a red-colored lamp.

As shown in FIG. 3, ribbed structures 60 are constructed of a plurality of convex ribs, each individual rib approximately semicylindrical in shape and extending side by side in the vertical orientation. In the embodiment shown in FIGS. 1–3, there are two ribbed structures 60; one of ribbed structures 60 located on each side of the lamp. In a preferred embodiment, ribbed structures 60 comprise nine individual convex ribs on each side of the conical protrusion 50. Ribbed structures 60 resemble a plurality of convex semi-cylindrical contours in the lens. As can be seen in FIG. 3, ribbed structures 60 are internal optical elements present on inner face 43 of lens 40. The outer face 44 of lens 40, surrounding elliptical protrusions 70, is planar. The radius of each convex rib varies. In this embodiment, the two ribs 60' have a slightly larger radius than the adjacent convex ribs, which facilitates focusing the light emitted from the light emitting diodes 42 disposed under convex ribs 60'. Ribbed structures 60 are designed to distribute the light horizontally approximately 60 degrees left and right of the longitudinal axis of lamp 10.

FIG. 3 also illustrates convex lens 80 on inner face 43 of lens 40. As can be seen in FIG. 3, each elliptical protrusion 70 has a corresponding convex lens 80. Each convex lens 80 collimates the cone of light produced by the one or more light emitting diodes 42. In this way, the collimated light is redirected laterally and toward elliptical protrusion 70, which then concentrates and directs the light 60 degrees to 90 degrees left and right of the longitudinal axis of lamp 10. The principle behind the optics will be further explained infra.

With further reference to FIG. 3, housing 30 is made of the same material and is tinted the same color as lens 40. In the embodiment shown here, housing 30 is a one-piece transparent plastic molding. Circuit board 41 is connected by terminals 20 to circuitry to supply power to light emitting diodes 42. Circuit board 41 and the one or more light emitting diodes 42 are embedded into potting material for protection and stability. In one embodiment of the invention, the potting material is epoxy. Housing 30 is attached to lens 40 to form lamp 10. After housing 30 and lens 40 are attached, lamp 10 is hermetically sealed for protection against humidity, dust and the like.

Figure 4:
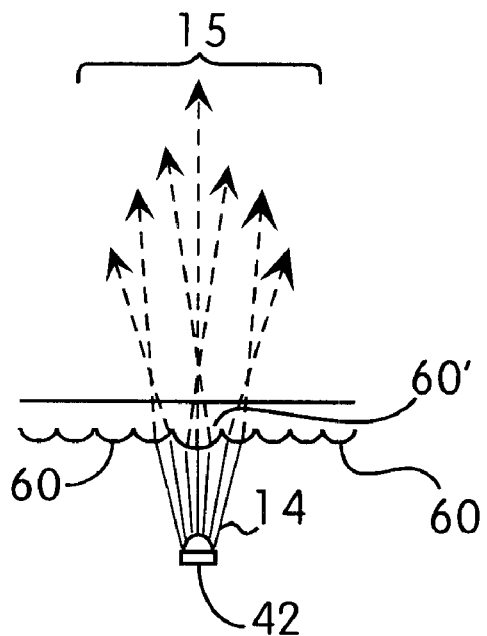
FIG. 4 is a pictorial representation of the path of a beam of light from the light emitting diode toward the ribbed section of the lens.

FIG. 4 is a schematic representation of light rays 14, produced by one light emitting diode 42, that are directed toward ribbed structures 60. FIG. 4 illustrates how light rays 14 are refracted by ribbed structures 60 to produce resultant light distribution 15. As mentioned supra, each of convex ribs 60', directly above light emitting diodes 42, have a larger radius (or depth) than the adjacent ribs. The larger radius of a convex rib 60' directly above light emitting diode 42 enhances the concentration and distribution of light rays 14 emitted from light emitting diode 42. It should be noted that FIG. 4 does not depict all of light rays 14 that hit ribbed structures 60. It should also be noted that lamp 10 is a three dimensional structure with depth and length, all of which help resultant light distribution 15 to be distributed over the required angles between 0 degrees and 60 degrees.

Figure 5:
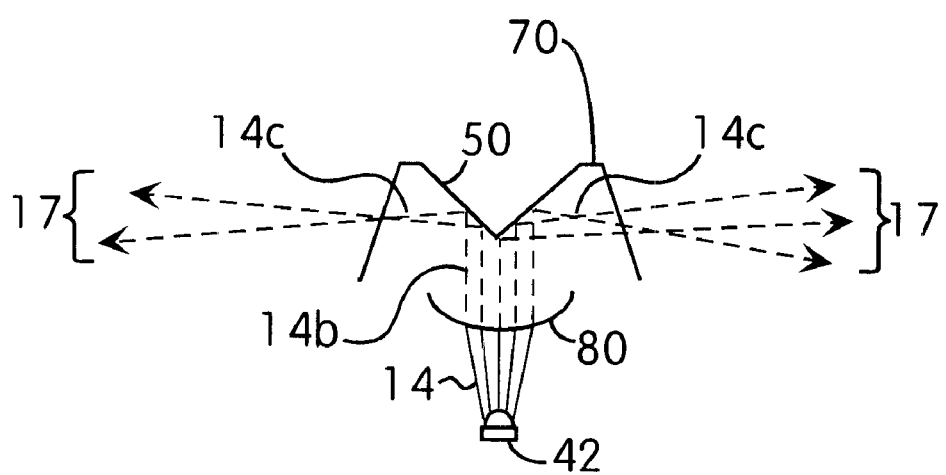
FIG. 5 is a pictorial representation of the path of a beam of light from the light emitting diode toward the collimating lens and the conical depression.

FIG. 5 is a schematic representation of light rays 14 impinging convex lens 80 and conical depression 50, resulting in total internal reflection of the light emitted from one of light emitting diodes 42. In particular, light rays 14, produced by one of the light emitting diodes 42 disposed under convex lens 80, impinges convex lens 80. Light rays 14 are refracted by convex lens 80, collimating the light to produce refracted rays 14b, which are beams of substantially parallel light. The shape of conical depression 50 and the space between light emitting diode 42 and convex lens 80 insures the concentration of light into a parallel beam and eliminates the presence of hot centers caused by the light-emitting diode 42.

Light rays 14b then impinge the internal surface of conical depression 50 at an angle equal to or greater than the critical angle. As used herein, critical angle is defined as the minimum angle of incidence at which total internal reflection takes place. As used herein, total internal reflection is defined as the reflection that occurs within a substance because the angle of incidence of light striking the boundary surface is in excess of the critical angle. Accordingly, in the embodiment shown here, when light rays 14b contact the internal surface of conical depression 50 at the critical angle or greater, light rays 14b are reflected from the surface, resulting in reflected rays 14c, and no transmission occurs through the surface of conical depression 50.

Reflected light rays 14c then impinge on the outer surface of elliptical protrusion 70, producing resultant light distribution 17. Light distribution 17 is substantially uniform and is distributed substantially 60 degrees to 90 degrees. Elliptical protrusion 70 acts as a lens and directs the light. More specifically, the elliptical shape concentrates light rays 14c, which are progressing radially from conical depression 50, into light distribution 17. This concentration assures adequate intensity to the left and right of lamp 10. In the embodiment shown here, conical depression 50 has a diameter of approximately 6 mm to distribute the light substantially 60 degrees to 90 degrees.

Figure 6:
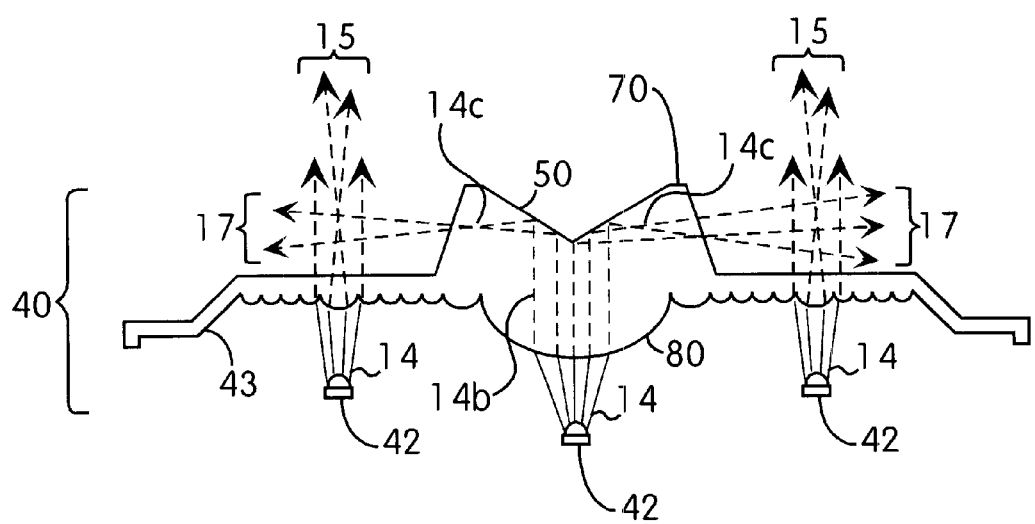
FIG. 6, a combination of FIGS. 4 and 5, illustrates the distribution of light emitted from the light emitting diodes.

FIG. 6 is a schematic representation of FIGS. 4 and 5 combined. As mentioned supra, the combination of ribbed structures 60, conical depression 50, elliptical protrusion 70 and convex lens 80 produces light distributions 17 and 15. The overall effect of the combined optical elements is a rectangular distribution of light with the appropriate light intensities and angular distribution to meet the requirements for combination marker/clearance lamps.

One of ordinary skill in the art would readily appreciate that the aforementioned spreading of light can be accomplished any number of ways through the use of known optical structures. For example, a red-colored lamp only requires one elliptical protrusion 70 with conical depression 50 surrounded by ribbed structures 60.

The description presented in the preferred embodiments described herein of ribbed structures, a conical depression and elliptical protrusion, and a convex lens are not intended to demonstrate all of the possible arrangements and modifications. For those skilled in the art, changes will be apparent that will fall within the scope of the present invention.

What is claimed is:

1. A lamp, comprising:
   a housing;
   at least one light source; and
   a lens, adjacent to said at least one light source, comprising at least one optical element for reflecting light emitted from said at least one light source, at least one optical element for spreading light emitted from said at least one light source, and at least one optical element for distributing light emitted from said at least one light source substantially 60 degrees to 90 degrees left and right of the longitudinal axis of said lamp.

2. The lamp according to claim 1 wherein said at least one optical element for distributing light substantially 60 degrees to 90 degrees is at least one elliptical protrusion.

3. The lamp according to claim 2 wherein each of said at least one elliptical protrusion defines a conical depression.

4. The lamp according to claim 3 further comprising at least one convex surface for collimating light emitted from each of said at least one light source thereby illuminating each of said conical depression.

5. The lamp according to claim 1 wherein said at least one optical element for spreading light distributes light substantially 0 degrees to 60 degrees left and right of the longitudinal axis of said lamp.

6. The lamp according to claim 5 wherein said at least one optical element for spreading light comprises a plurality of ribbed structures.

7. The lamp according to claim 1 wherein each of said at least one light source is a light emitting diode.

8. The lamp according to claim 7 further comprising at least one terminal in contact with said housing for electrical connection to a power source.

9. The lamp according to claim 8 further comprising a circuit board operatively connected to said at least one light source wherein said circuit board is operatively connected to said at least one terminal.

10. The lamp according to claims 9 further comprising potting material for embedding said at least one light source and said circuit board.

11. A lamp, comprising:
    a housing;
    at least one light source;
    a lens, adjacent to said at least one light source, comprising at least one elliptical protrusion, each of said at least one elliptical protrusion defining a conical depression, and at least one convex surface operatively disposed to collimate light emitted from said at least one light source such that light impinging the surface of each of said conical depression is reflected.

12. The lamp according to claim 11 wherein said lens distributes light emitted from said at least one light source substantially 60 degrees to 90 degrees left and right of the longitudinal axis of said lamp.

13. The lamp according to claim 11 wherein said lens further comprises a plurality of ribbed structures.

14. The lamp according to claim 13 wherein said lens distributes light emitted from said at least one light source substantially 0 degrees to 90 degrees left and right of the longitudinal axis of said lamp.

15. The lamp according to claim 11 wherein each of said at least one light source is a light emitting diode.

16. The lamp according to claim 15 further comprising a circuit board operatively connected to said at least one light source for supplying power to said at least one light source.

17. The lamp according to claim 16 further comprising potting material for embedding said at least one light source and said circuit board.

18. A lens, comprising:

a front surface and a rear surface;

said front surface comprising at least one elliptical protrusion, each of said at least one elliptical protrusion defining a conical depression;

said rear surface comprising at least one convex surface operatively disposed to collimate light emitted from at least one light source such that light impinging the surface of said conical depression is reflected;

wherein said lens distributes light emitted from said at least one light source substantially 60 degrees to 90 degrees left and right of the longitudinal axis of said lens.

19. The lens according to claim 18 herein said rear surface further comprises a plurality of ribbed structures.

20. The lamp according to claim 19 wherein said ribbed structures distribute light emitted from said at least one light source substantially 0 degrees to 60 degrees left and right of the longitudinal axis of said lens.

* * * * *